US012725386B2

(12) United States Patent
Chang et al.

(10) Patent No.: US 12,725,386 B2
(45) Date of Patent: Sep. 1, 2026

(54) IMAGE PROCESSING DEVICE AND METHOD

(71) Applicant: Quanta Computer Inc., Taoyuan City (TW)

(72) Inventors: Chia-Yuan Chang, Taoyuan City (TW); Kai-Ju Cheng, Taoyuan City (TW); Yu-Hsun Chen, Taoyuan City (TW); Chin-Yuan Ting, Taoyuan City (TW); Shao-Ang Chen, Taoyuan City (TW)

(73) Assignee: QUANTA COMPUTER INC., Taoyuan City (TW)

(*) Notice: Subject to any disclaimer, the term of this patent is extended or adjusted under 35 U.S.C. 154(b) by 106 days.

(21) Appl. No.: 18/667,410

(22) Filed: May 17, 2024

(65) Prior Publication Data

US 2025/0173928 A1 May 29, 2025

(30) Foreign Application Priority Data

Nov. 23, 2023 (TW) ................................ 112145272

(51) Int. Cl.
*G06T 11/60* (2026.01)
*G06T 17/00* (2006.01)
(Continued)

(52) U.S. Cl.
CPC .............. *G06T 11/60* (2013.01); *G06T 17/00* (2013.01); *G06V 10/141* (2022.01); *G06V 10/16* (2022.01); *G06V 10/44* (2022.01); *G06V 10/806* (2022.01)

(58) Field of Classification Search
CPC ....... G06T 11/60; G06T 17/00; G06V 10/806; G06V 10/141; G06V 10/16; G06V 10/44
See application file for complete search history.

(56) References Cited

U.S. PATENT DOCUMENTS 7,821,649 B2 * 10/2010 Bendall .............. G01B 11/2527 356/606
8,752,967 B2 6/2014 Hung
(Continued)

FOREIGN PATENT DOCUMENTS

| CN | 116580300 A | 8/2023 |
|---|---|---|
| TW | 201305856 A | 2/2013 |
| TW | 202124908 A | 7/2021 |

OTHER PUBLICATIONS

Extended European Search Report dated Nov. 29, 2024, issued in application No. EP 24180342.8.
(Continued)

*Primary Examiner* — Xiao M Wu
*Assistant Examiner* — Ahmed Taha
(74) *Attorney, Agent, or Firm* — McClure, Qualey & Rodack, LLP

(57) ABSTRACT

An image processing device is provided in the invention. The image processing device may include a photographing device and a calculation circuit. The photographing device may photograph an object which is illuminated by a structured light to generate a structured-light image. The calculation circuit may perform a grayscale process on the structured-light image to generate a grayscale image. The calculation circuit may perform a binarization process on the grayscale image to generate a binarization image. The calculation circuit may generate a curvature image corresponding to the structured-light image according to the binarization image.

16 Claims, 4 Drawing Sheets

(51) Int. Cl.

| | |
|---|---|
| ***G06V 10/10*** | (2022.01) |
| ***G06V 10/141*** | (2022.01) |
| ***G06V 10/44*** | (2022.01) |
| ***G06V 10/80*** | (2022.01) |

(56) References Cited

U.S. PATENT DOCUMENTS

| | | | | |
|---|---|---|---|---|
| 8,855,388 | B2 * | 10/2014 | Wehnes | G06T 7/0012 382/128 |
| 8,970,693 | B1 * | 3/2015 | Chang | G06T 19/006 348/136 |
| 11,297,289 | B2 | 4/2022 | Lu | |
| 2016/0088287 | A1 * | 3/2016 | Sadi | H04N 13/117 348/43 |
| 2016/0350929 | A1 * | 12/2016 | Tubic | G06T 7/593 |
| 2021/0279493 | A1 * | 9/2021 | Appia | G06V 20/64 |

OTHER PUBLICATIONS

Zhang, D., et al.; “Palmprint Recognition Using 3-D Information;” IEEE Transactions on Systems, Man, and Cybernetics—Part C: Applications and Reviews; vol. 39; No. 5; Sep. 2009; pp. 505-519.

Cui, H., et al.; “Registration and integration algorithm in structured light three-dimensional scanning based on scale-invariant feature matching of multi-source images;” Chinese Optics Letters; Sep. 2012; pp. 091001-1 thru 091001-5.

Geng, J.; “Structured-light 3D surface imaging: a tutorial;” IEEE Intelligent Transportation System Society; Mar. 2011; pp. 128-160.

Chinese language office action dated Aug. 7, 2024, issued in application No. TW 112145272.

* cited by examiner

IMAGE PROCESSING DEVICE AND METHOD

CROSS REFERENCE TO RELATED APPLICATIONS

This Application claims priority of TW Patent application No. 112145272 filed on Nov. 23, 2023, the entirety of which is incorporated by reference herein.

BACKGROUND OF THE INVENTION

Field of the Invention

The invention generally relates to image processing technology, and more particularly, to image processing technology in which a structured-light is used to generate a curvature image.

Description of the Related Art

Structured-light technology is a technology applied to three-dimensional (3D) measurement. In structured-light technology, an object illuminated by the structured-light will be photographed frequently to generate structured-light images, and the variance of the characteristic patterns in each structured-light image and the next structured-light image will be analyzed to reconstruct the surface and the 3D coordinates of the object. Therefore, in the current structured-light technology, the structured-light images need to be generated frequently, and a precise calculation for the 3D coordinates of the object is required.

Therefore, how to generate structured-light images without a higher photographic frequency and precise calculations for the 3D coordinates of the object, and then using them in different image processing applications, is a subject which is worthy of discussion.

BRIEF SUMMARY OF THE INVENTION

An image processing device and method are provided to overcome the problems mentioned above.

An embodiment of the invention provides an image processing device. The image processing device may include a photographing device and a calculation circuit. The photographing device may photograph an object which is illuminated by a structured light to generate a structured-light image. The calculation circuit may perform a grayscale process on the structured-light image to generate a grayscale image, perform a binarization process on the grayscale image to generate a binarization image, and generate a curvature image corresponding to the structured-light image according to the binarization image.

An embodiment of the invention provides an image processing method. The image processing method may be applied to an image processing device. The image processing may include following steps. A photographing device of the image processing device may photograph an object which is illuminated by a structured light to generate a structured-light image. Then, a calculation circuit of the image processing device may perform a grayscale process on the structured-light image to generate a grayscale image. Then, the calculation circuit may perform a binarization process on the grayscale image to generate a binarization image. Then, the calculation circuit may generate a curvature image corresponding to the structured-light image according to the binarization image.

Other aspects and features of the invention will become apparent to those with ordinary skill in the art upon review of the following descriptions of specific embodiments of an image processing device and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
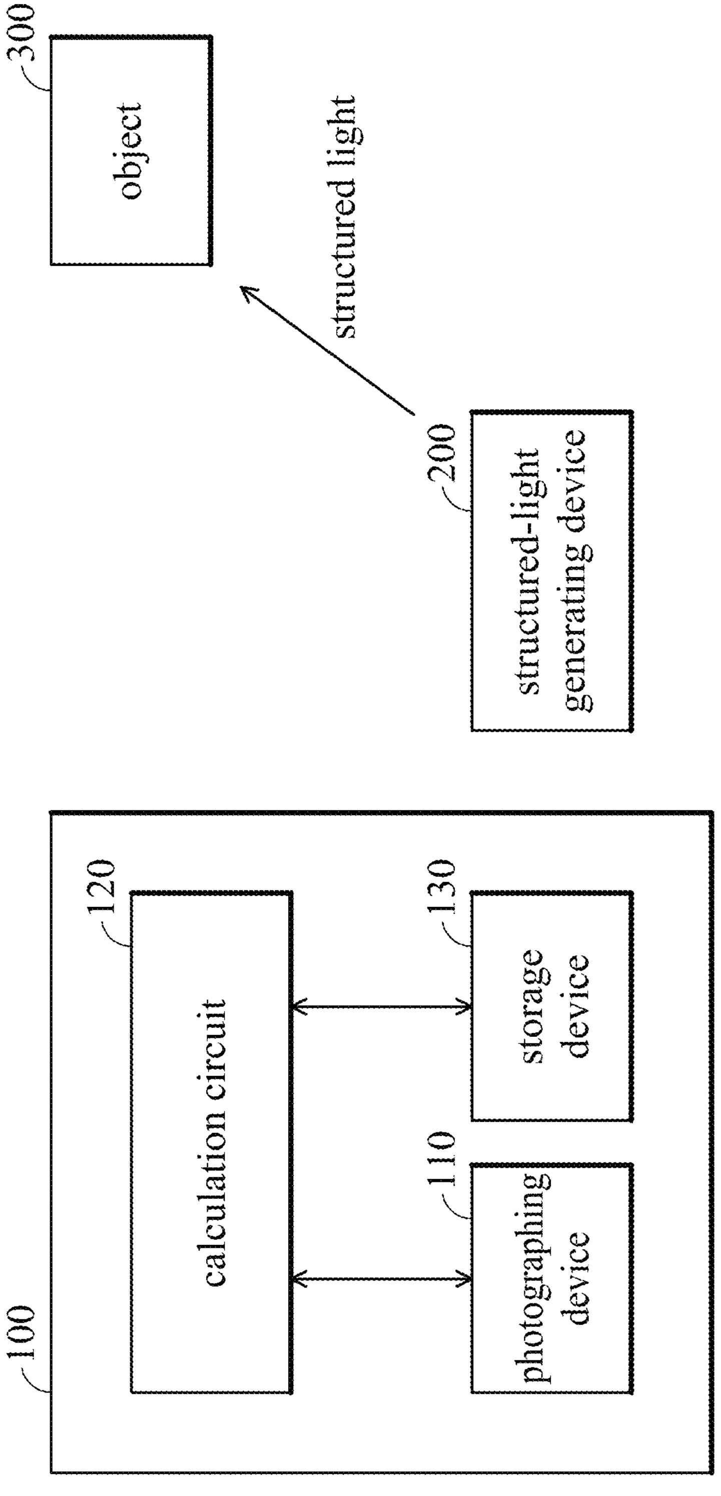
FIG. 1 is a block diagram of an image processing device 100 according to an embodiment of the invention.

FIG. 1 is a block diagram of an image processing device 100 according to an embodiment of the invention. As shown in FIG. 1, the image processing device 100 may comprise a photographing device 110, a calculation circuit 120, and a storage device 130. It should be noted that FIG. 1 presents a simplified block diagram in which only the elements relevant to the invention are shown. However, the invention should not be limited to what is shown in FIG. 1. The image processing device 100 may also comprise other elements.

According to the embodiments of the invention, the photographing device 110 may be an electronic device with photographing function, e.g., a phone, a camera or a dental mirror, but the invention should not be limited thereto. According to an embodiment of the invention, the photographing device 110 may photograph an object 300 which is illuminated by a structured light to generate a structured-light image. In an embodiment, the structured image may be generated by an external structured-light generating device 200. In another embodiment, the structured-light generating device 200 also can be integrated into the photographing device 110. The structured-light generating device 200 may generate a parallel line (linear) structured-light, a grid structured-light, or a circle structured-light, but the invention should not be limited thereto.

According to an embodiment of the invention, the calculation circuit 120 may be configured to perform the operations and calculations of the image processing of the invention.

According to the embodiments of the invention, the storage device 130 may be a volatile memory (e.g. Random Access Memory (RAM)), or a non-volatile memory (e.g. flash memory, Read Only Memory (ROM)), a hard disk, or a combination of the above memory devices. The storage device 130 may be configured to store the files and data about the image processing, and store related the software program codes required by the calculation circuit 120 when the calculation circuit 120 performs the operations and calculations of the image processing.

According to an embodiment of the invention, the image processing device 100 may also comprise a processor. The processor may be configured to control the operations of the photographing device 110, the calculation circuit 120 and the storage device 130.

According to an embodiment of the invention, after the photographing device 110 generates the structured-light image, the calculation circuit 120 may perform a grayscale processing on the structured-light image to generate a grayscale image. Specifically, the calculation circuit 120 may transform the structured-light image to into a grayscale image through a grayscale processing. Then, the calculation circuit 120 may perform a binarization process on the grayscale image to generate a binarization image, and then generate a curvature image (or a curvature diagram, or an assistant image) corresponding to the structured-light image according to the binarization image. The curvature image corresponding to the structured-light image may be applied to different applications, e.g., image stitching, 3D model establishment for an object, the training data of an artificial intelligence (AI) model, but the invention should not be limited thereto.

According to an embodiment of the invention, the grayscale processing algorithm may comprise averaging the RGB pixels of color image to generate the pixels of grayscale image (i.e., grayscale value=0.33R+0.33G+0.33B). According to another embodiment of the invention, the grayscale processing algorithm may be designed by setting different weights for RGB based on the human eye sensitivity for colors, e.g., grayscale value=0.299R+0.587G+0.114B According to an embodiment of the invention, when the structured light illuminating on the object 300 is a parallel line structured-light, in the binarization process, the calculation circuit 120 may perform binarization process on each pixel of the grayscale image according to a threshold. For example, the threshold may be set to 130, but the invention should not be limited thereto. When a pixel value (or grayscale value) a pixel of the grayscale image is lower than 130, the calculation circuit 120 may set the pixel value of the pixel to a first value (e.g., 0), and when a pixel value (or grayscale value) a pixel of the grayscale image is not lower than (equal to or higher than) 130, the calculation circuit 120 may set the pixel value of the pixel to a second value (e.g., 255) to perform the binarization process on the grayscale image. After the above binarization process, the calculation circuit 120 may transform the grayscale image into the binarization image.

Figure 2:
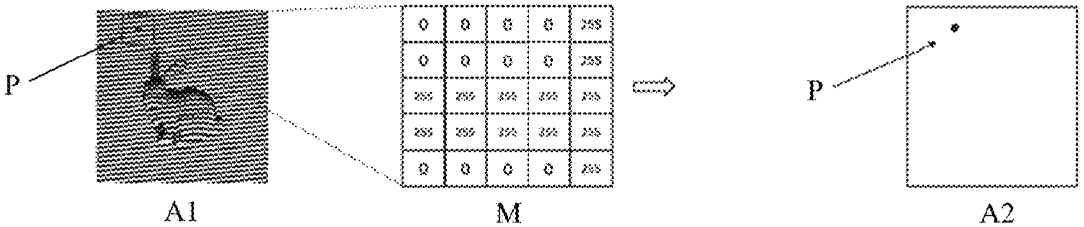
FIG. 2 is a schematic diagram of generating a curvature image according to an embodiment of the invention.

Then, the calculation circuit 10 may perform an averaging calculation on the pixels in a default range corresponding to each pixel of the binarization image to generate the pixels of the curvature image. FIG. 2 is taken as an example for illustration below. According to an embodiment of the invention, the default range may be determined according to a pre-set kernel value. If the kernel value is 5, the default range corresponding to each pixel of the binarization image may comprise 25 pixels (5*5). In a specific embodiment, the kernel value is odd and among 3~21, e.g., 3, 5, 7, 9, 11, but the invention should not be limited thereto.

FIG. 2 is a schematic diagram of generating a curvature image according to an embodiment of the invention. As shown in FIG. 2, after the grayscale process and the binarization process, the value a pixel P of a structured-light image A1 corresponding to a parallel line structured-light is 255. In addition, the default range corresponding to the pixel P is a 5*5 (i.e., the kernel value is 5) pixel matrix M whose center is the pixel P. The calculation circuit 120 may perform an averaging calculation on the pixels in the pixel matrix to calculate that the pixel values corresponding to the pixel P in the curvature image A2 is 132 (i.e., 255*13/25). It should be noted that FIG. 2 is only used to illustrate an embodiment of the invention, but the invention should not be limited thereto.

According to another embodiment of the invention, when the structured light illuminating on the object 300 is a grid structured-light, in the binarization process, the calculation circuit 120 may set the pixel values of the pixels corresponding to the structured light (i.e., the pixels illuminated by the structured light, or the pixels covered by grid lines) in the grayscale image to a first value (e.g., 255), and set the pixel values of the pixels which does not correspond to the structured light (i.e., the pixels which are not illuminated by the structured light) in the grayscale image to a second value (e.g., 0) to generate the binarization image.

Then, the calculation circuit 120 may calculate the up, down, left and right distances between each pixel with the second value (e.g., 0, i.e., the pixels which are not illuminated by the structured light) and the grid structured-light in the binarization image (i.e., calculate the distance between the pixel and its corresponding above grid line, the distance between the pixel and its corresponding below grid line, the distance between the pixel and its corresponding left grid line, and the distance between the pixel and its corresponding right grid line). Then, the calculation circuit 120 may sum up the up, down, left and right distances between each pixel and the grid structured-light, and perform a normalize calculation on the summed distance values (e.g., transform a range (e.g., 200~900, but the invention should not be limited thereto) of the summed distance values corresponding to all pixels into a new range (e.g., 0~255)) to generate the pixel value of each pixel which is not illuminated by the structured light in the curvature image.

In addition, in an embodiment, the calculation circuit 120 may set the pixel values of pixels corresponding to the first value (e.g., 255, i.e., the pixels illuminated by the structured light) in the curvature image to a default value (e.g., 0) first. Then, the calculation circuit 120 may perform an averaging calculation on the pixels in a range (e.g., 3*3 pixel matrix, but the invention should not be limited thereto) corresponding to each pixel with the default value (i.e., the pixels illuminated by the structured light) to generate the pixel values corresponding to these pixels (i.e., the pixels illuminated by the structured-light) in the curvature image. Details about how to generate the curvature image corresponding to the structured-light image corresponding to the grid structured-light will be illustrated through FIG. 3 below.

Figure 3:
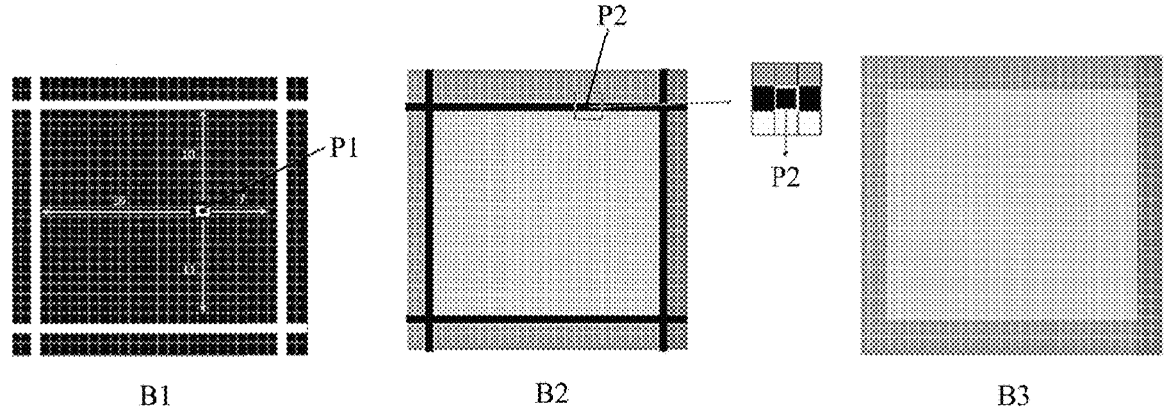
FIG. 3 is a schematic diagram of generating a curvature image according to another embodiment of the invention.

FIG. 3 is a schematic diagram of generating a curvature image according to another embodiment of the invention. As shown in FIG. 3, after the grayscale process and binarization process are performed on the pixels in a grid B1 of the structured light image corresponding to the grid structured-light, the pixel values of the pixels corresponding to the structured light (i.e., the pixels illuminated by the structured light, or the pixels covered by grid lines) may be set to a first value (e.g., 255), and the pixel values of the pixels which does not correspond to the structured light (i.e., the pixels which are not illuminated by the structured light) may be set to a second value (e.g., 0). Then, the calculation circuit 120 may calculate the up, down, left and right distances between each pixel with the second value (e.g., 0, i.e., the pixels which are not illuminated by the structured light) and the grid structured-light in the grid B1 (i.e., calculate the distance between the pixel and its corresponding above grid line, the distance between the pixel and its corresponding below grid line, the distance between the pixel and its corresponding left grid line, and the distance between the pixel and its corresponding right grid line). Then, the calculation circuit 120 may sum up the up, down, left and right distances between each pixel and the grid structured-light, and perform a normalize calculation on the summed distance values. For example, as shown in FIG. 3, the distance between the pixel P1 in the grid B1 and the grid line, such as the distance between the pixel P1 and its below grid line, the distance between the pixel P1 and the left grid line, and the distance between the pixel P1 and the right grid line are 10, 11, 16 and 7 respectively. Therefore, the calculation circuit 120 may sum up the distances (i.e., 10+11+16+7=44). Then, after the calculation circuit 120 has obtain the summed distance value of the up, down, left and right distances of each pixel corresponding to the second value, the calculation circuit 120 may perform a normalize calculation on the summed distance values, i.e., the calculation circuit 120 may transform a range (e.g., 200~900, but the invention should not be limited thereto) of the summed distance values into a new range (e.g., 0~255). In other words, the summed distance value of the pixel P1 will be transformed into the new range (e.g., 0~255) to generate the pixel value of the pixel P1 in the curvature image B2 (or curvature image B3). Accordingly, the calculation circuit 120 can generate the pixels values of all pixels corresponding to the structured light in the grid B1 in the curvature image B2 (or curvature image B3). It should be noted that, in the curvature image B2 and the curvature image B3 of FIG. 3, the pixels corresponding to the structured light in the grid B1 are displayed by the same pixel values (or grayscale values), but the invention should not be limited thereto. That is to say, in the curvature image B2 and the curvature image B3 of FIG. 3, the pixels corresponding to the structured light in the grid B1 may be corresponding to different pixel values (or grayscale values).

In addition, in an embodiment, the calculation circuit 120 may set the pixel value of each pixel (e.g., pixel P2) corresponding to the first value (e.g., 255) in the curvature image B2 to a default value (e.g., 0). Then, the calculation circuit 120 may perform an averaging calculation on the pixels in a range corresponding to each pixel with the default value (i.e., the pixels illuminated by the structured light) to generate the pixel values corresponding to these pixels (i.e., the pixels illuminated by the structured light) in the curvature image B3. For example, the calculation circuit 120 may perform an averaging calculation on the pixels in a range (e.g., the 3*3 pixel matrix Ml whose center is the pixel P2) corresponding to the pixel P2 of the curvature image B2 to generate the pixel values corresponding to the pixel P2 in the curvature image B3. The curvature image B3 can be regarded as the final curvature image corresponding to the grid B1 of the structured-light image. It should be noted that FIG. 3 is only used to illustrate the embodiment of the invention, but the invention should be limited thereto.

It should be noted that the parallel line structured-light and the grid structured-light are only taken as examples to illustrate the embodiments of the invention, but the invention should not be limited thereto. The embodiments of the invention also can be applied to other types of structured-light after appropriate adjustments. For example, if the circle structured-light is adopted, the calculation circuit 120 may concern the deformation of the circle (i.e., the ratio of the major axis and the minor axis of an ellipse when the circle becomes ellipse) to generate the curvature image.

Figure 4:
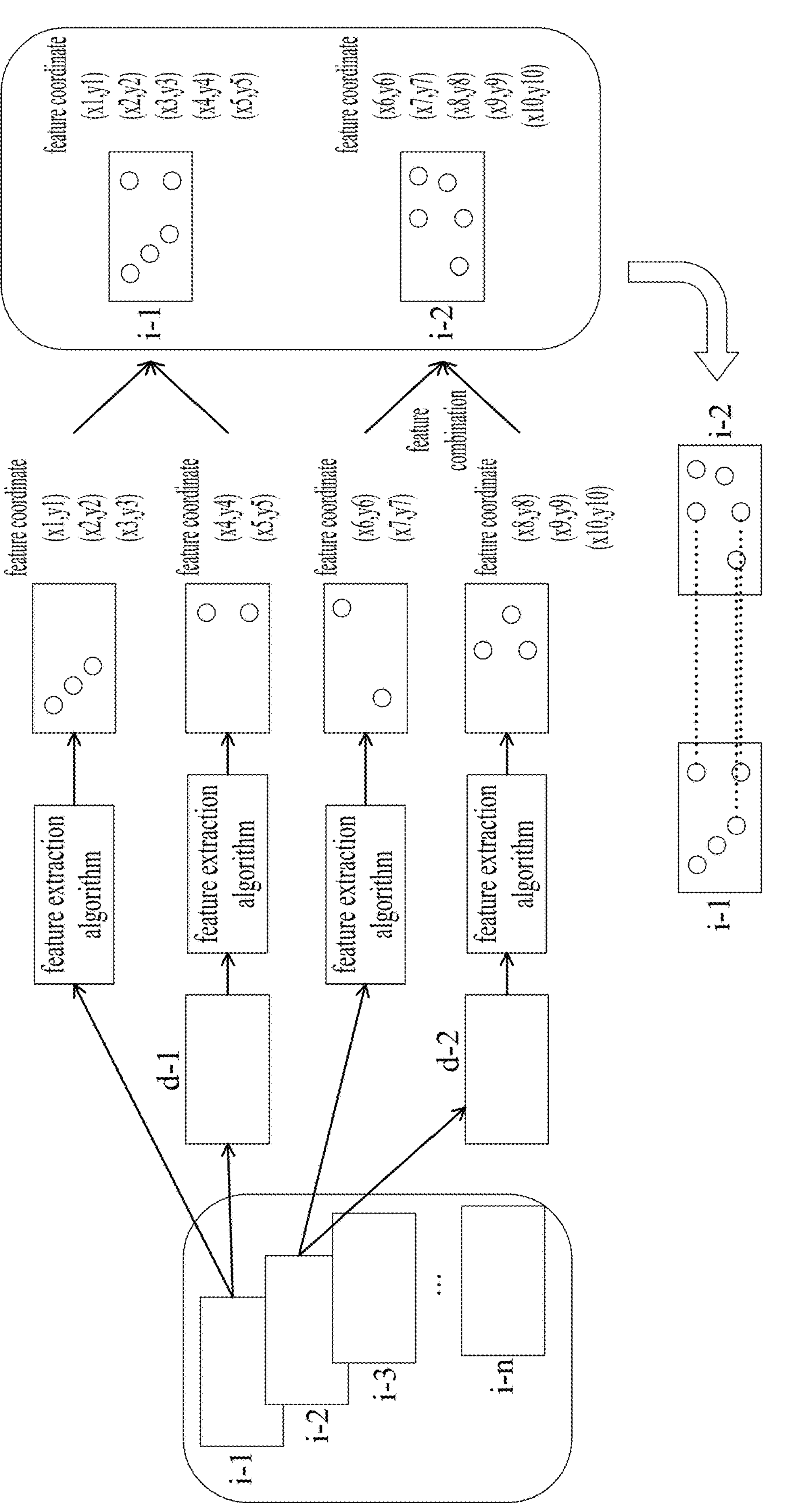
FIG. 4 is a schematic diagram of an image stitching according to an embodiment of the invention.

According to an embodiment of the invention, the curvature image corresponding to the structured-light image may be applied to the image stitching to increase the accuracy of image stitching. Specifically, the photographing device 110 may photo the object 300 continuously to generate a plurality of normal images (i.e., the object 300 in the images is not illuminated by the structured light). In addition, the photographing device 110 may also generate a plurality of structured-light images corresponding to the normal images. The calculation circuit 120 may transform the structured-light images to a plurality of curvature images. Then, the calculation circuit 120 may obtain the feature information of each normal image and each curvature image according to a feature extraction algorithm. The calculation circuit 120 may combine the feature information of each normal image and its corresponding curvature image to generate the combined feature information corresponding to each normal image. Then, the calculation circuit 120 may stitch all normal images together according to the combined feature information corresponding to each normal image. FIG. 4 will be taken as an example for illustration below.

According to an embodiment of the invention the feature extraction algorithm may comprise for example a histogram of oriented gradients (HOG) algorithm, a scale invariant feature transform (SIFT) algorithm, and a maximally stable extremal regions (MSER) algorithm.

FIG. 4 is a schematic diagram of an image stitching according to an embodiment of the invention. As shown in FIG. 4, the photographing device 110 may photo an object continuously to generate a plurality of normal images i-1~i-n. In addition, the photographing device 110 may also generate a plurality of structured-light images corresponding to the normal images i-1~i-n. The calculation circuit 120 may transform the structured-light images to a plurality of curvature images d-1~d-n. Then, the calculation circuit 120 may obtain the feature information of each normal image i-1~i-n and each curvature image d-1~d-n according to a feature extraction algorithm. The calculation circuit 120 may combine the feature information of each normal image i-1~i-n and its corresponding curvature image to generate the combined feature information corresponding to each normal image i-1~i-n. Then, the calculation circuit 120 may stitch all normal images i-1~i-n together according to the combined feature information corresponding to each normal image i-1~i-n.

As shown in FIG. 4, stitching the first normal image i-1 with the second normal image i-2 is taken as an example. The calculation circuit 120 may obtain the first feature information (e.g., feature coordinates (x1,y1), (x2,y2), (x3,y3)) corresponding to the first normal image i-1, and obtain the second feature information (e.g., feature coordinates (x4,y4), (x5,y5)) corresponding to the first curvature image d-1 corresponding to the first normal image i-1 according to a feature extraction algorithm. In addition, the calculation circuit 120 may obtain the third feature information (e.g., feature coordinates (x6,y6), (x7,y7)) corresponding to the second normal image i-2, and obtain the fourth feature information (e.g., feature coordinates (x8,y8), (x9,y9), (x10,y10)) corresponding to the second curvature image d-2 corresponding to the second normal image i-2 according to a feature extraction algorithm. Then, the calculation circuit 120 may combine the first feature information with the second feature information to generate the first combined feature information (e.g., feature coordinates (x1,y1), (x2,y2), (x3,y3), (x4,y4), (x5,y5)) corresponding to the first normal image i-1, and combine the third feature information with the fourth feature information to generate the second combined feature information (e.g., feature coordinates (x6, y6), (x7,y7), (x8,y8), (x9,y9), (x10,y10)) corresponding to the second normal image i-2. Then, the calculation circuit 120 may stitch the first normal image i-1 with the second normal image i-2 together according to the first combined feature information and the second combined feature information.

According to another embodiment, the curvature image corresponding to the structured-light image may be applied to the 3D model establishment to increase the accuracy of 3D model establishment. Specifically, the photographing device 110 may photo the object 300 continuously to generate a plurality of normal images (i.e., the object 300 in the images is not illuminated by the structured light). In addition, the photographing device 110 may also generate a plurality of structured-light images corresponding to the normal images. The calculation circuit 120 may transform the structured-light images to a plurality of curvature images. Then, the calculation circuit 120 may obtain the feature information of each normal image and each curvature image according to a feature extraction algorithm. The calculation circuit 120 may combine the feature information of each normal image and its corresponding curvature image to generate the combined feature information corresponding to each normal image. Then, the calculation circuit 120 may generate the rotation matrixes and the translation matrixes between each normal image according to the combined feature information corresponding to each normal image. Then, the calculation circuit 120 may stitch all normal images together according to the rotation matrixes and the translation matrixes to establish the 3D model corresponding to the object.

According to another embodiment, the curvature image corresponding to the structured-light image may be applied to the training data of an AI model. Specifically, the curvature image corresponding to the structured-light image may be used as a data channel of the AI model to generate one output data for generating the training data. For example, in the embodiment, the convolutional neural network (CNN) mode may have four channels corresponding to R, G, B and curvature image to generate the output data for generating the training data in the CNN model. The curvature image may provide the depth information to increase the success rate of the AI model recognizing the object.

Figure 5:
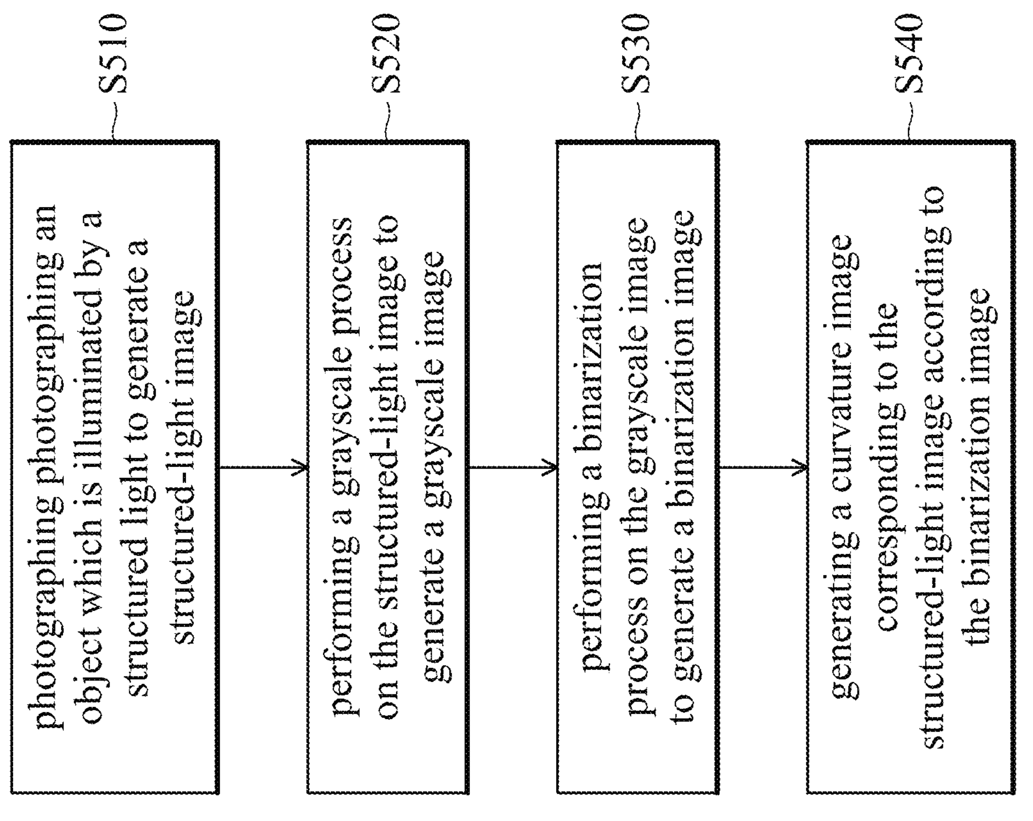
FIG. 5 is a flow chart illustrating an image processing method according to an embodiment of the invention.

FIG. 5 is a flow chart illustrating an image processing method according to an embodiment of the invention. The flow of FIG. 5 can be applied to the image processing device 100. As shown in FIG. 5, in step S510, a photographing device of the image processing device 100 may photograph an object which is illuminated by a structured light to generate a structured-light image.

In step S520, a calculation circuit of the image processing device 100 may perform a grayscale process on the structured-light image to generate a grayscale image.

In step S530, the calculation circuit of the image processing device 100 may perform a binarization process on the grayscale image to generate a binarization image.

In step S540, the calculation circuit of the image processing device 100 may generate a curvature image corresponding to the structured-light image according to the binarization image.

According to an embodiment of the invention, in the image processing method, when the structured light is a parallel line structured-light, in the binarization process, the calculation circuit of the image processing device 100 may perform the binarization process on each pixel of the grayscale image according to a threshold to generate the binarization image. Then, the calculation circuit of the image processing device 100 may perform an averaging calculation on the pixels in a range corresponding to each pixel of the binarization image to generate the pixel value of each pixel of the curvature image.

According to an embodiment of the invention, in the image processing method, when the structured light is a grid structured-light, in the binarization process, the calculation circuit of the image processing device 100 may set the pixels corresponding to the structured light (i.e., illuminated by the structured light) in the grayscale image to a first value, and set the pixels which do not correspond to the structured light in the grayscale image to a second value to generate the binarization image.

According to an embodiment of the invention, in the image processing method, the calculation circuit of the image processing device 100 may calculate the up, down, left and right distances between each pixel with the second value and the structured light in the binarization image. Then, the calculation circuit of the image processing device 100 may sum up the up, down, left and right distances between each pixel and the structured light, and perform a normalize calculation on the summed distance values to generate the pixel value of each pixel which does not correspond to the structured light in the curvature image.

In addition, in the image processing method, in an embodiment, the calculation circuit of the image processing device 100 may set the pixel value of each pixel with the first value in the curvature image to a default value. Then, the calculation circuit of the image processing device 100 may perform an averaging calculation on the pixels in a range corresponding to each pixel with the first value in the curvature image to generate the pixel value of each value corresponding to the structured light in the curvature image.

According to an embodiment of the invention, in the image processing method, the photographing device of the image processing device 100 may photograph the object continuously to generate a first normal image and a second normal image. Then, the photographing device of the image processing device 100 may generate a first structured-light image corresponding to the first normal image, and a second structured-light image corresponding to the second normal image. Then, the calculation circuit of the image processing device 100 may generate a first curvature image corresponding to the first structured-light image, and generate a second curvature image corresponding to the second structured-light image.

According to an embodiment of the invention, in the image processing method, the calculation circuit of the image processing device 100 may obtain the first feature information corresponding to the first normal image, and obtain the second feature information corresponding to the first curvature image. Then, the calculation circuit of the image processing device 100 may combine the first feature information and the second feature information to generate the first combined feature information. In addition, the calculation circuit of the image processing device 100 may obtain the third feature information corresponding to the second normal image, and obtain the fourth feature information corresponding to the second curvature image. Then, the calculation circuit of the image processing device 100 may combine the third feature information and the fourth feature information to generate the second combined feature information.

According to an embodiment of the invention, in the image processing method, the calculation circuit of the image processing device 100 may stitch the first normal image and the second normal image together according to the first combined feature information and the second combined feature information.

According to another embodiment of the invention, in the image processing method, the calculation circuit of the image processing device 100 may generate a rotation matrix and a translation matrix according to the first combined feature information and the second combined feature information. Then, the calculation circuit of the image processing device 100 may establish a 3D model of the object according to the rotation matrix and the translation matrix.

According to the image processing method provided in the invention, the image processing device can be used to generate the curvature image corresponding to the structured-light image, and apply the curvature image to different image processing applications. In addition, according to the image processing method provided in the invention, the image processing device can generate structured-light images without higher photographic frequency and precise calculation for the 3D coordinates of the object.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image processing device, comprising:

a photographing device, photographing an object which is illuminated by a structured light to generate a structured-light image; and a calculation circuit, performing a grayscale process on the structured-light image to generate a grayscale image, performing a binarization process on the grayscale image to generate a binarization image, and generating a curvature image corresponding to the structured-light image according to the binarization image, wherein when the structured light is a grid structured-light, in the binarization process, the calculation circuit sets the pixels corresponding to the structured light in the grayscale image to a first value, and sets the pixels which do not correspond to the structured light in the grayscale image to a second value to generate the binarization image, wherein the calculation circuit calculates up, down, left and right distances between each pixel with the second value and the structured light in the binarization image, sums up the up, down, left and right distances between each pixel and the structured light, and performs a normalize calculation on the summed distance values to generate the pixel value of each pixel which does not correspond to the structured light in the curvature image.

2. The image processing device of claim 1, wherein when the structured-light is a parallel line structured-light, in the binarization process, the calculation circuit performs the binarization process on each pixel of the grayscale image according to a threshold.

3. The image processing device of claim 2, wherein the calculation circuit performs an averaging calculation on all pixels in a range corresponding to each pixel of the binarization image to generate a pixel value of each pixel of the curvature image.

4. The image processing device of claim 1, wherein the calculation circuit further performs an averaging calculation on the pixels in a range corresponding to each pixel with the first value in the curvature image to generate the pixel value of each value corresponding to the structured light in the curvature image.

5. The image processing device of claim 1, wherein the photographing device further photographs the object continuously to generate a first normal image and a second normal image, and generates a first structured-light image corresponding to the first normal image, and a second structured-light image corresponding to the second normal image, and wherein the calculation circuit generates a first curvature image corresponding to the first structured-light image, and generates a second curvature image corresponding to the second structured-light image.

6. The image processing device of claim 5, wherein the calculation circuit obtains first feature information corresponding to the first normal image, and second feature information corresponding to the first curvature image, and combines the first feature information and the second feature information to generate first combined feature information, and wherein the calculation circuit obtains third feature information corresponding to the second normal image, and fourth feature information corresponding to the second curvature image, and combines the third feature information and the fourth feature information to generate second combined feature information.

7. The image processing device of claim 6, wherein the calculation circuit stitches the first normal image and the second normal image together according to the first combined feature information and the second combined feature information.

8. The image processing device of claim 6, wherein the calculation circuit generates a rotation matrix and a translation matrix according to the first combined feature information and the second combined feature information, and establishes a three-dimensional (3D) model of the object according to the rotation matrix and the translation matrix.

9. An image processing method, applied to an image processing device, comprising:

photographing, by a photographing device of the image processing device, an object which is illuminated by a structured light to generate a structured-light image;

performing, by a calculation circuit of the image processing device, a grayscale process on the structured-light image to generate a grayscale image;

performing, by the calculation circuit, a binarization process on the grayscale image to generate a binarization image; and generating, by the calculation circuit, a curvature image corresponding to the structured-light image according to the binarization image, wherein the method further comprises:

when the structured light is a grid structured-light, in the binarization process, setting, by the calculation circuit, the pixels corresponding to the structured light in the grayscale image to a first value, and the pixels which do not correspond to the structured light in the grayscale image to a second value to generate the binarization image;

calculating, by the calculation circuit, up, down, left and right distances between each pixel with the second value and the structured light in the binarization image; and summing up, by the calculation circuit, the up, down, left and right distances between each pixel and the structured light, and performing a normalize calculation on the summed distance values to generate the pixel value of each pixel which does not correspond to the structured light in the curvature image.

10. The image processing method of claim 9, further comprising:

when the structured light is a parallel line structured-light, in the binarization process, performing, by the calculation circuit, the binarization process on each pixel of the grayscale image according to a threshold.

11. The image processing method of claim 10, further comprising:

performing, by the calculation circuit, an averaging calculation on all pixels in a range corresponding to each pixel of the binarization image to generate a pixel value of each pixel of the curvature image.

12. The image processing method of claim 9, further comprising:

performing, by the calculation circuit, an averaging calculation on the pixels in a range corresponding to each pixel with the first value in the curvature image to generate the pixel value of each value corresponding to the structured light in the curvature image.

13. The image processing method of claim 9, further comprising:

photographing, by the photographing device, the object continuously to generate a first normal image and a second normal image;

generating, by the photographing device, a first structured-light image corresponding to the first normal image, and a second structured-light image corresponding to the second normal image; and generating, by the calculation circuit, a first curvature image corresponding to the first structured-light image, and a second curvature image corresponding to the second structured-light image.

14. The image processing method of claim 13, further comprising:

obtaining, by the calculation circuit, first feature information corresponding to the first normal image, and second feature information corresponding to the first curvature image;

combining, by the calculation circuit, the first feature information and the second feature information to generate first combined feature information;

obtaining, by the calculation circuit, third feature information corresponding to the second normal image, and fourth feature information corresponding to the second curvature image; and combining, by the calculation circuit, the third feature information and the fourth feature information to generate second combined feature information.

15. The image processing device of claim 14, further comprising:

stitching, by the calculation circuit, the first normal image and the second normal image together according to the first combined feature information and the second combined feature information.

16. The image processing device of claim 14, further comprising:

generating, by the calculation circuit, a rotation matrix and a translation matrix according to the first combined feature information and the second combined feature information; and establishing, by the calculation circuit, a three-dimensional (3D) model of the object according to the rotation matrix and the translation matrix.

* * * * *